(12) United States Patent
Kuchiki et al.

(10) Patent No.: US 11,027,815 B2
(45) Date of Patent: Jun. 8, 2021

(54) NAVIGATION METHOD FOR SHIP, AND SHIP

(71) Applicant: MITSUBISHI SHIPBUILDING CO., LTD., Kanagawa (JP)

(72) Inventors: Yusuke Kuchiki, Tokyo (JP); Shingen Takeda, Tokyo (JP); Hiroshi Tamura, Tokyo (JP); Masahiko Mino, Tokyo (JP); Tatsuaki Kanaga, Tokyo (JP); Yushi Ashizawa, Tokyo (JP)

(73) Assignee: MITSUBISHI SHIPBUILDING CO., LTD., Kanagawa (JP)

( * ) Notice: Subject to any disclaimer, the term of this patent is extended or adjusted under 35 U.S.C. 154(b) by 156 days.

(21) Appl. No.: 16/317,616

(22) PCT Filed: Jul. 3, 2017

(86) PCT No.: PCT/JP2017/024364
§ 371 (c)(1),
(2) Date: Jan. 14, 2019

(87) PCT Pub. No.: WO2018/105160
PCT Pub. Date: Jun. 14, 2018

(65) Prior Publication Data
US 2019/0291841 A1    Sep. 26, 2019

(30) Foreign Application Priority Data

Dec. 7, 2016    (JP) .............................. JP2016-237284

(51) Int. Cl.
*B63J 3/04*        (2006.01)
*B63J 3/02*        (2006.01)
(Continued)

(52) U.S. Cl.
CPC ................ *B63J 3/04* (2013.01); *B63B 45/00* (2013.01); *B63H 21/17* (2013.01); *B63J 3/02* (2013.01);
(Continued)

(58) Field of Classification Search
CPC ....... B63J 3/04; B63J 3/02; B63J 99/00; B63J 2003/002; B63H 2021/205;
(Continued)

(56) References Cited

U.S. PATENT DOCUMENTS 8,479,673 B1    7/2013    Ledder et al.

FOREIGN PATENT DOCUMENTS

EP        3046206 A1    7/2016
EP        3498584 A1    6/2019
(Continued)

OTHER PUBLICATIONS

International Search Report and Written Opinion for International Application No. PCT/JP2017/024364 dated Aug. 1, 2017; 12pp.

*Primary Examiner* — Arnold M Kinkead
(74) *Attorney, Agent, or Firm* — Kanesaka Berner and Partners LLP

(57) ABSTRACT

A navigation method for a ship which includes: a plurality of main generators that feed power to navigation equipment used in normal navigation and appliances for the living quarters provided within a ship body; and an emergency generator that feeds power to emergency equipment in case of fire or flood. The navigation method includes: an emergency power feeding step for feeding power to the emergency equipment using the emergency generator when at least one of the plurality of main generators is disabled due to fire or flood; and a return-to-port power feeding step for feeding power to return-to-port equipment, required for navigation for returning to port, using the main generators (Continued)

and the emergency generator after the fire or flood has subsided.

5 Claims, 11 Drawing Sheets

(51) Int. Cl.
    *B63J 99/00*     (2009.01)
    *H02J 9/06*     (2006.01)
    *B63B 45/00*     (2006.01)
    *B63H 21/17*     (2006.01)
    *B63J 3/00*     (2006.01)
    *B63H 21/20*     (2006.01)

(52) U.S. Cl.
    CPC ................ B63J 99/00 (2013.01); H02J 9/06 (2013.01); *B63H 2021/205* (2013.01); *B63H 2021/207* (2013.01); *B63J 2003/002* (2013.01); *Y02E 10/50* (2013.01); *Y02E 10/70* (2013.01); *Y02T 70/5236* (2013.01)

(58) Field of Classification Search
    CPC .. B63H 2021/207; B63H 21/17; B63B 43/00; B63B 27/10; H02J 9/06; Y02T 70/5236; Y02E 10/50; Y02E 10/727
    USPC .................................. 307/43, 48, 57, 85, 86
    See application file for complete search history.

(56) References Cited

FOREIGN PATENT DOCUMENTS

| | | | |
|---|---|---|---|
| JP | 11266532 A | | 9/1999 |
| JP | 2000280987 A | * | 10/2000 |
| JP | 2000280987 A | | 10/2000 |
| JP | 2003137168 A | | 5/2003 |
| JP | 2016078478 A | | 5/2016 |
| WO | WO-2014155520 A1 | * | 10/2014 .......... H01M 10/613 |

* cited by examiner

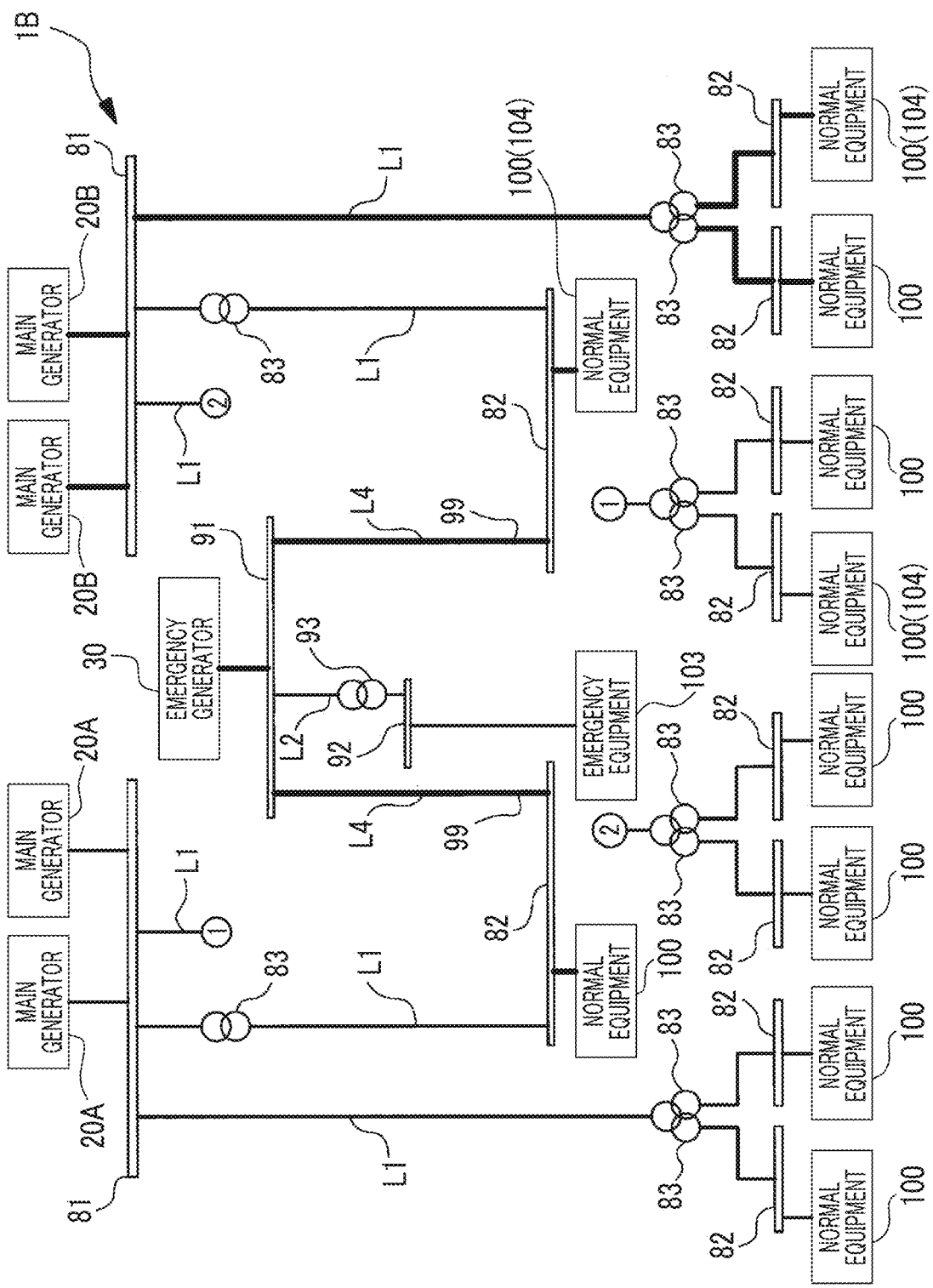

NAVIGATION METHOD FOR SHIP, AND SHIP

RELATED APPLICATIONS

The present application is a National Phase of International Application Number PCT/JP2017/024364 filed Jul. 3, 2017 and claims priority to Japanese Application Number 2016-237284 filed Dec. 7, 2016.

TECHNICAL FIELD

The present invention relates to a navigation method for a ship, and a ship.

This application claims the benefit of priority based on Japanese Patent Application No. 2016-237284, filed Dec. 7, 2016, the content of which is incorporated herein by reference.

BACKGROUND ART

With revision of SOLAS Convention in 2009, a passenger ship is required to navigate to a port in a self-dependent manner even in a case where the ship is flooded due to damage or fire occurs.

Inside a ship body of a ship, a main engine, a generator, or the like required for obtaining thrust of the ship is accommodated.

For example, as disclosed in PTL 1, the main engine or the generator is disposed inside an engine room.

In the above-described ship, a plurality of engine rooms may be provided in order to secure redundancy. In such a configuration, in a case where fire or flood occurs in any one engine room, power is fed to emergency equipment, such as a fire pump, a drainage pump, and emergency illumination using an emergency generator provided independently of the engine room, and fire or flood subsides. After fire or flood has subsided, power feeding to the emergency equipment by the emergency generator is stopped, and a generator (main generator) in an engine room where fire or flood does not occur is operated, whereby power is fed to return-to-port equipment required for returning to a port, and self-dependent navigation is enabled.

CITATION LIST

Patent Literature

[PTL 1] Japanese Unexamined Patent Application Publication No. 2003-137168

SUMMARY OF INVENTION

Technical Problem

In a configuration in which a plurality of engine rooms are provided as described above, in a case where fire, flood, or the like occurs in one of the plurality of engine rooms, power to be fed to the return-to-port equipment may be short only with the generator in the engine room where fire or flood does not occur. For example, in a case where a plurality of generators are provided in each engine room, when one or more generators of the plurality of generators cannot be used, power to be fed may be short.

In contrast, it is also considered that a generator provided in each engine room increases in capacity or the number of generators increases, thereby securing power feeding ability.

However, an increase in capacity of the generator or in the number of generators results in an increase in equipment cost, an increase in weight, confinement of a space inside the ship, or the like.

An object of the invention is to provide a navigation method for a ship, and a ship capable of suppressing shortage of a power feeding amount in returning to a port through self-dependent navigation after fire or flood occurs while suppressing an increase in equipment cost and an increase in weight.

Solution to Problem

According to a first aspect of the invention, there is provided a navigation method for a ship including a plurality of main generators and an emergency generator. The plurality of main generators feed power to navigation equipment for use in normal navigation and living quarter appliances provided inside a ship body. The emergency generator feeds power to emergency equipment when fire or flood occurs. The navigation method includes an emergency power feeding step of feeding power to the emergency equipment using the emergency generator when at least a part of the plurality of main generators are disabled due to fire or flood. The navigation method further includes a return-to-port power feeding step of feeding power to return-to-port equipment required for navigation for returning to a port using the main generators and the emergency generator after fire or flood has subsided.

In this way, power is fed to the return-to-port equipment required for returning to the port using the main generators and the emergency generator, instead of only the main generators, after fire or flood has subsided, whereby it is possible to increase power capable of being fed to the return-to-port equipment. Accordingly, there is no need to achieve an increase in capacity of the main generators or an increase in the number of main generators in order to secure power to be fed to the return-to-port equipment required for returning to the port after fire or flood has subsided.

According to a second aspect of the invention, in the return-to-port power feeding step according to the first aspect, the emergency generator may feed power to at least a part of the living quarter appliances.

With this configuration, it is possible to feed power to at least minimum appliances required for living quarters inside the ship body using the emergency generator in returning to the port after fire or flood has subsided.

According to a third aspect of the invention, in the return-to-port power feeding step according to the second aspect, the main generators may feed power to at least a part of the navigation equipment and another part of the living quarter appliances.

With this configuration, it is possible to feed power to at least minimum navigation equipment required for returning to the port after fire or flood has subsided using the main generators. Furthermore, it is possible to feed power to equipment required for living quarters inside the ship body using the main generators and the emergency generator in returning to the port after fire or flood has subsided.

According to a fourth aspect of the invention, in the return-to-port power feeding step according to any one of the first to third aspects, power to be fed using the emergency generator having facility capacity smaller than that of the main generators may be fixed, and power to be fed using the main generators may be made to fluctuate as required.

With this configuration, when required power fluctuates, power to be fed using the main generators having facility capacity greater than the emergency generator is made to fluctuate, whereby it is possible to cope with large load fluctuation more than in a case where power to be fed using the emergency generator having smaller facility capacity is made to fluctuate. With this, it is possible to make fed power cope with fluctuation of required power more flexibly.

According to a fifth aspect of the invention, a ship includes a ship body, a plurality of main generators provided inside the ship body, and an emergency generator provided inside the ship body. The ship includes a first power feeding line, a second power feeding line, and a third power feeding line. The first power feeding line connects navigation equipment for use in normal navigation and living quarter appliances provided inside the ship body to the plurality of main generators. The second power feeding line connects, to the emergency generator, emergency equipment for use when fire or flood occurs. The third power feeding line connects, to the emergency generator, return-to-port equipment for use in navigation for making the ship return to a port in a state in which fire or flood has been stopped.

With this configuration, in normal navigation, it is possible to feed power from the plurality of main generators to the navigation equipment and the living quarter appliance through the first power feeding line. When fire, flood, or the like occurs, it is possible to feed power from the emergency generator to the emergency equipment through the second power feeding line. When the ship is made to return to the port in a state in which fire or flood has been stopped, it is possible to feed power from the emergency generator to the return-to-port equipment through the third power feeding line.

According to a sixth aspect of the invention, in the ship according to the fifth aspect, the main generator may be are provided in a lower portion inside the ship body, and the emergency generator may be provided in a part equal to or higher than an upper deck of the ship body.

With this configuration, even though fire or flood occurs in the engine room provided with the main generator, it is possible to operate to the emergency generator to feed power while suppressing the influence of fire or flood. With this, it is possible to reliably execute subsidence of fire or flood and return-to-port of the ship after fire or flood has subsided.

According to a seventh aspect of the invention, the return-to-port equipment according to the fifth or sixth aspect may be connected to the first power feeding line and the third power feeding line to allow power switching.

With this configuration, it is possible to use the return-to-port equipment as navigation equipment or a living quarter appliance even in normal navigation.

Advantageous Effects of Invention

With the navigation method for a ship, and the ship described above, it is possible to suppress shortage of the power feeding amount in returning to the port through self-dependent navigation after fire or flood occurs while suppressing an increase in equipment cost and an increase in weight.

BRIEF DESCRIPTION OF DRAWINGS

FIG. 11 is a diagram showing a power feeding state in returning to a port through self-dependent navigation after fire or flood has subsided in the ship according to the second embodiment of the invention.

DESCRIPTION OF EMBODIMENTS

Figure 1:
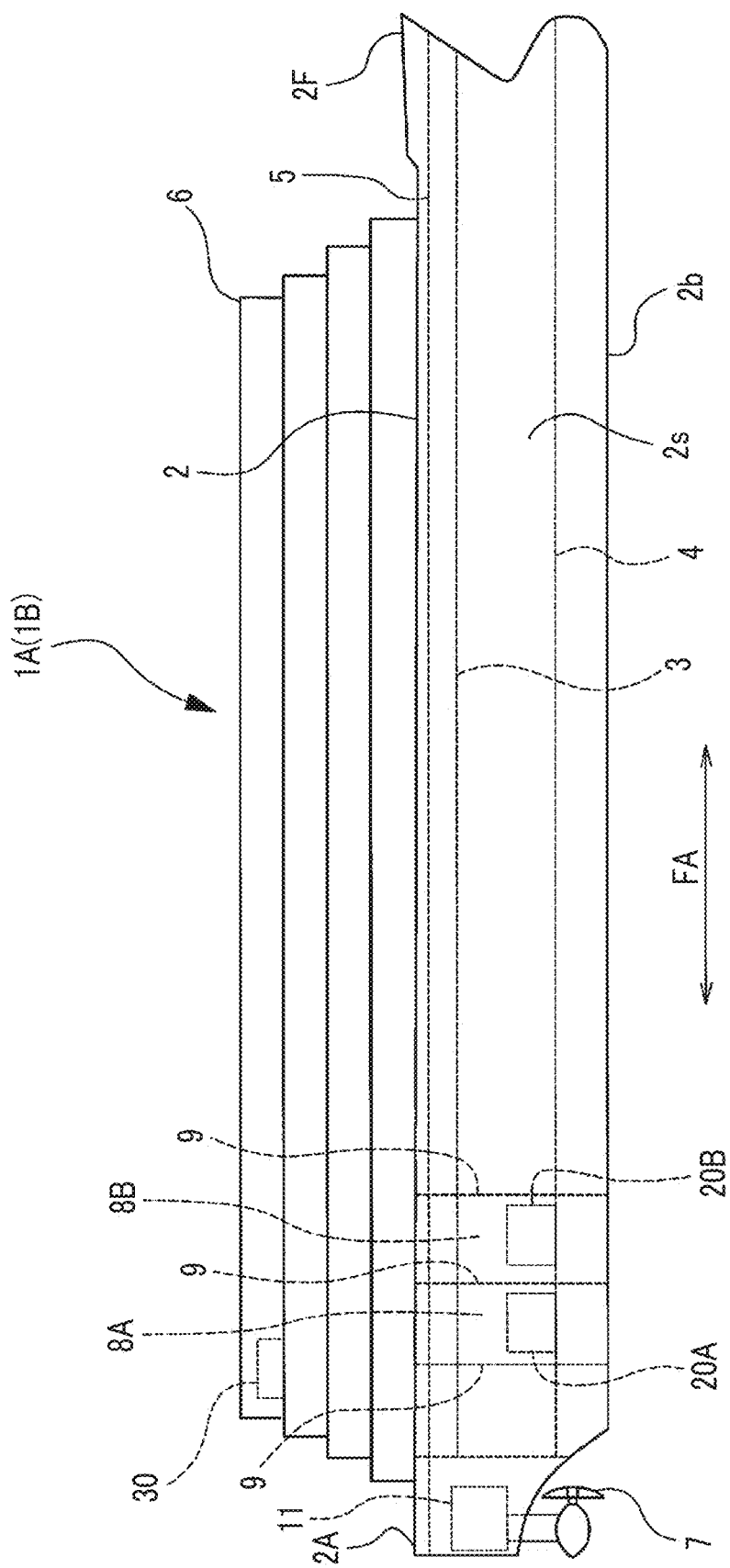
FIG. 1 is a side view showing the overall configuration of a ship according to an embodiment of the invention.

Hereinafter, a navigation method for a ship, and a ship according to an embodiment of the invention will be described referring to the drawings.

First Embodiment

FIG. 1 is a side view showing the overall configuration of a ship according to the embodiment of the invention.

As shown in FIG. 1, a ship 1A of the embodiment includes a ship body 2, main generators 20A and 20B, and an emergency generator 30.

Although the ship 1A is illustrated as a passenger ship, a ship type of a ship to which the invention can be applied is not limited to a specific ship type, and for example, various ship types, such as a ferry, a roll-on/roll-off ship (RORO ship), and a pure car & truck carrier (PCTC), can be employed.

The ship body 2 has a pair of broadsides 2s provided on both sides in a ship width direction, and a ship bottom 2b. The ship body 2 includes a freeboard deck 3, a lower deck 4, and an upper deck 5 inside thereof. The freeboard deck 3 is provided at an interval upward of the ship bottom 2b of the ship body 2. The lower deck 4 is provided between the ship bottom 2b and the freeboard deck 3 to form a double bottom in a lower portion of the ship body 2. The upper deck 5 is provided at an interval upward of the freeboard deck 3. On the upper deck 5, an upper structure 6 having a plurality of layers in an up-down direction is provided.

The ship body 2 includes a screw 7 below the ship bottom 2b in a stern part 2A. The screw 7 is rotationally driven by a propulsion motor 11 provided inside the ship body 2.

The main generators 20A and 20B are provided inside engine rooms 8A and 8B provided in a lower portion inside the ship body 2. The engine rooms 8A and 8B are formed between the lower deck 4 and the freeboard deck 3 inside the ship body 2. The engine rooms 8A and 8B are separated from each other by a transverse bulkhead 9 provided at an interval in a bow and stern direction FA of connecting the stern part 2A and a bow part 2F.

A plurality of main generators 20A are provided inside the engine room 8A. A plurality of main generators 20B are provided inside the engine room 8B.

The main generators 20A and 20B each primarily include, for example, an internal combustion engine part (not shown), such as a gas turbine or a diesel engine, and a generator part (not shown). In the main generators 20A and 20B combust fuel in the internal combustion engine part and drive the generator part to generate power.

Figure 2:
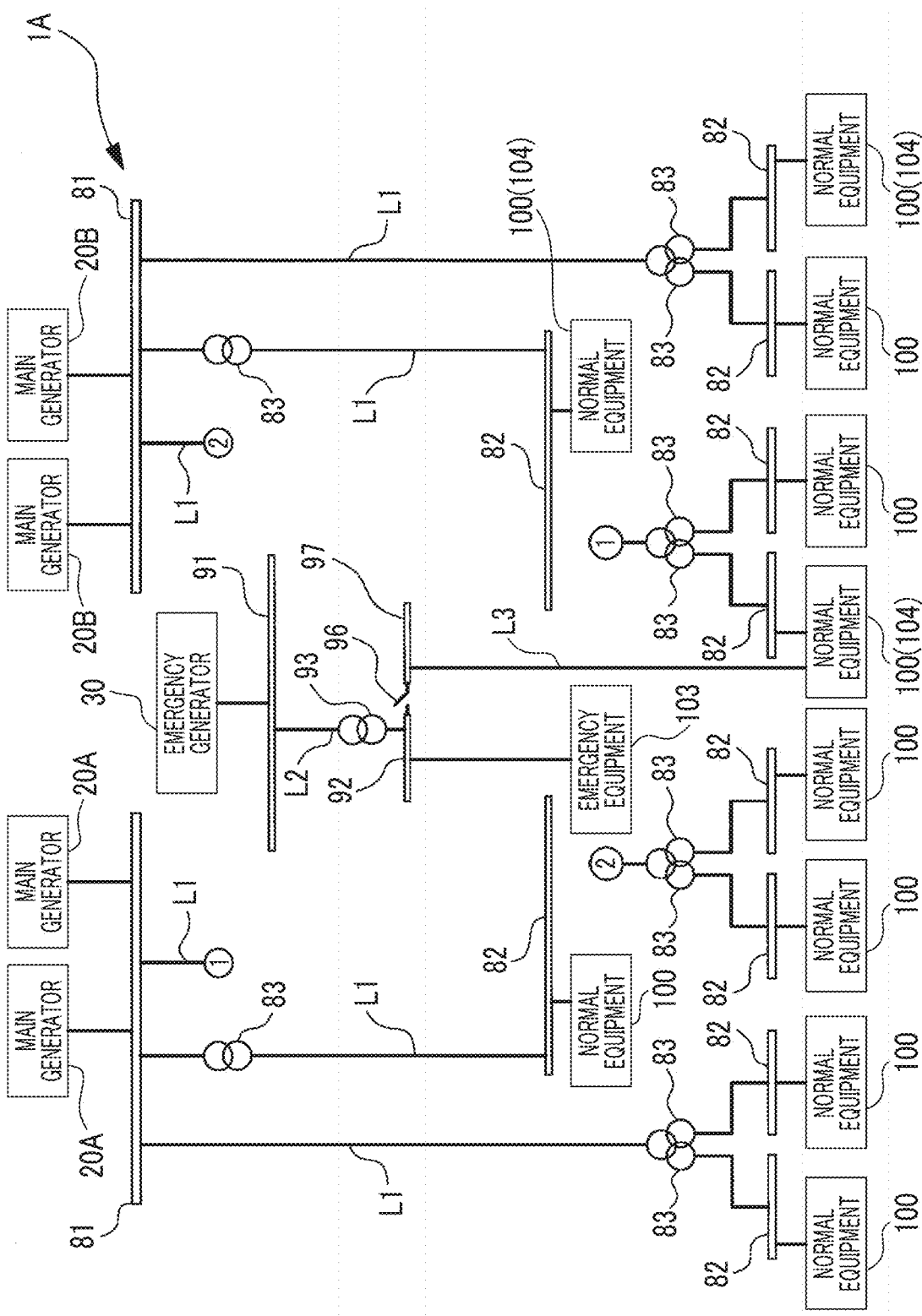
FIG. 2 is a diagram showing a power feeding system from main generators and an emergency generator in a ship according to a first embodiment of the invention.
Figure 3:
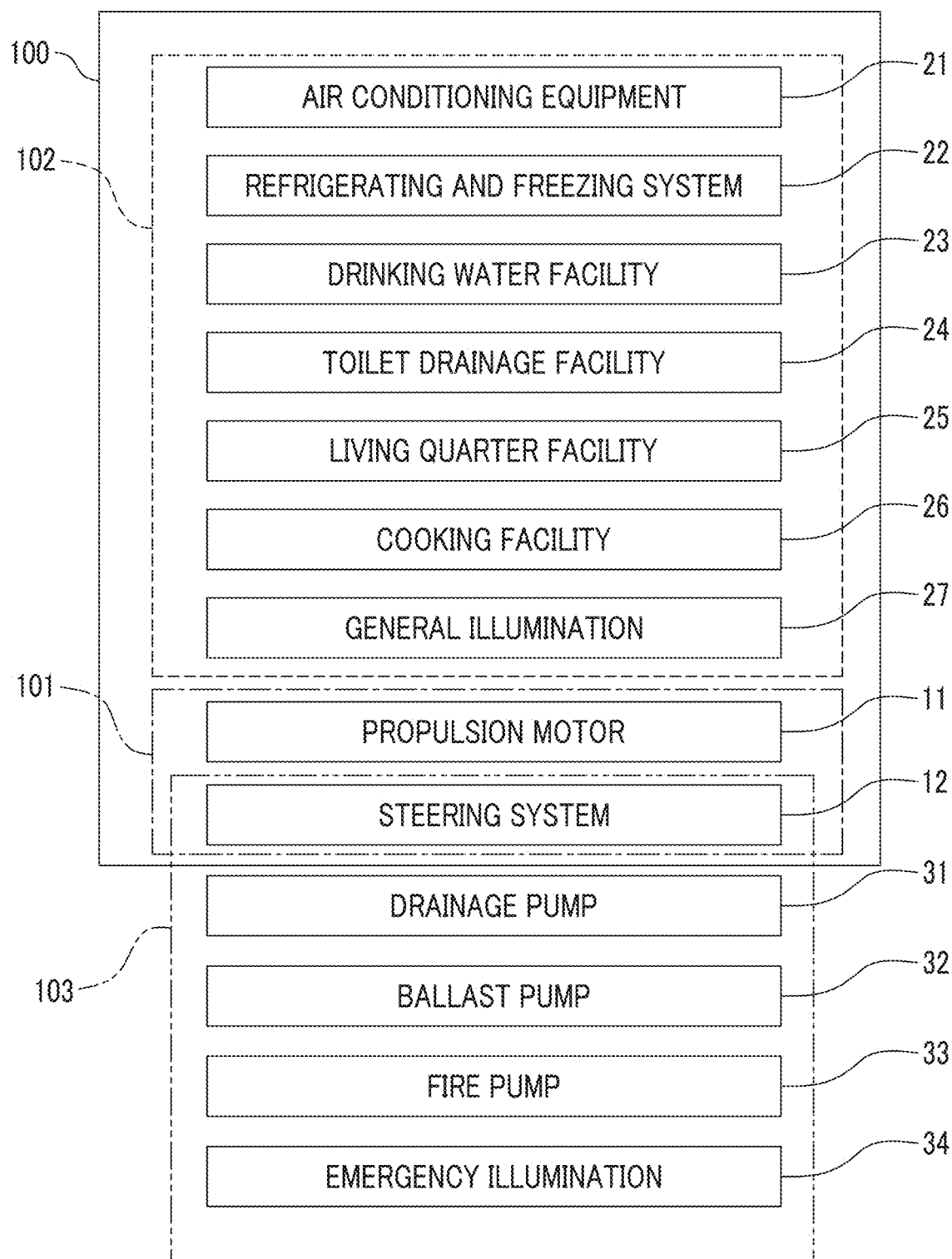
FIG. 3 is a block diagram showing an example of various kinds of equipment provided in the ship according to the first embodiment of the invention.

FIG. 2 is a diagram showing a power feeding system from the main generators and the emergency generator in a ship according to a first embodiment of the invention. FIG. 3 is a block diagram showing an example of various kinds of equipment provided in the ship.

As shown in FIG. 2, the main generators 20A and 20B each feed power to normal equipment 100 for use in normal navigation.

As shown in FIG. 3, the normal equipment 100 includes navigation equipment 101 and living quarter appliances 102. Examples of the navigation equipment 101 include a propulsion motor 11, a steering system 12, and the like. Examples of the living quarter appliances 102 include air conditioning equipment 21, a refrigerating and freezing system 22, a drinking water facility 23, and a toilet drainage facility 24 provided inside the ship 1A, a living quarter facility 25, a cooking facility 26, and a general illumination 27 as various kinds of equipment provided in living quarters, and the like.

As shown in FIG. 1, the emergency generator 30 is disposed in the upper structure 6. Specifically, the emergency generator 30 is disposed in an uppermost portion of the upper structure 6 on the stern part 2A side.

The emergency generator 30 is able to feed power to emergency equipment 103 when fire or flood occurs in at least the engine room 8A or the engine room 8B. The emergency generator 30 may feed power to each predetermined part inside the ship 1A at the time of anchorage, at the time of restoration from a dead ship state in which the entire ship 1A is powered off, or the like. The emergency generator 30 has facility capacity (or rated output) smaller than that of the main generators 20A and 20B. The emergency generator 30 illustrated in the embodiment has a rated voltage (hundreds of volts) lower than a rated voltage (for example, thousands of volts) of the main generators 20A and 20B.

As shown in FIG. 3, examples of the emergency equipment 103 include a drainage pump 31 that discharges water entering the ship body 2 to the outside of the ship, a ballast pump 32 that improves inclination of the ship body in the bow and stern direction FA or the ship width direction, a fire pump 33, an emergency illumination 34, and the like.

In the ship 1A, when fire or flood occurs in the engine room 8A or the engine room 8B, the emergency equipment 103 is operated with power fed from the emergency generator 30, whereby occurred fire or flood has subsided.

The ship 1A uses the main generators 20A or the main generators 20B and the emergency generator 30 in combination after fire or flood occurred in the engine room 8A or the engine room 8B has subsided, thereby navigating to the port in a self-dependent manner.

Hereinafter, a configuration for making the ship 1A navigate in a self-dependent manner will be described.

As shown in FIG. 2, the ship 1A includes first power feeding lines L1, a second power feeding line L2, and a third power feeding line L3.

The first power feeding lines L1 connect the normal equipment 100 (the navigation equipment 101 and the living quarter appliances 102) to the plurality of main generators 20A and 20B. The main generators 20A and 20B are connected to a plurality of first power feeding lines L1 through generator-side switchboards 81 and 81.

Each first power feeding line L1 is connected to equipment-side switchboards 82 to which various kinds of normal equipment 100 are connected. In each equipment-side switchboard 82, a voltage to be output from the main generators 20A or the main generators 20B is deboosted to a predetermined voltage (for example, several hundreds of volts) by a transformer 83 provided in the first power feeding line L1. Voltage values of a plurality of equipment-side switchboards 82 to which power is fed from the main generators 20A and 20B include a plurality of different voltage values. Each of various kinds of normal equipment 100 is connected to the equipment-side switchboard 82 having the voltage value according to a rated voltage of the normal equipment 100.

The second power feeding line L2 connects the emergency equipment 103 to the emergency generator 30. The emergency generator 30 is connected to the second power feeding line L2 through a generator-side switchboard 91.

The second power feeding line L2 is connected to an equipment-side switchboard 92 to which various kinds of emergency equipment 103 are connected. In each equipment-side switchboard 92, power to be output from the emergency generator 30 is deboosted (or boosted) to a predetermined voltage according to the rated voltage of the emergency equipment 103 by a transformer 93 provided in the second power feeding line L2 and fed.

The third power feeding line L3 connects, to the emergency generator 30, return-to-port equipment 104 for use in navigation for making the ship 1A return to the port in a state in which fire or flood has been stopped.

The return-to-port equipment 104 is, for example, the living quarter appliances 102 including the air conditioning equipment 21, the refrigerating and freezing system 22, the drinking water facility 23, the toilet drainage facility 24, the living quarter facility 25, the cooking facility 26, the general illumination 27, and the like described above. However, the return-to-port equipment 104 does not need to be all of the living quarter appliances 102, and for example, a part of the air conditioning equipment 21, the refrigerating and freezing system 22, the drinking water facility 23, the toilet drainage facility 24, the living quarter facility 25, the cooking facility 26, and the general illumination 27.

The third power feeding line L3 is connected to the equipment-side switchboard 92 provided in the second power feeding line L2 through a switch 96 and an equipment-side switchboard 97.

The return-to-port equipment 104 to which the third power feeding line L3 is connected may double as the normal equipment 100. The first power feeding line L1 and the third power feeding line L3 are connected to the return-to-port equipment 104, thereby allowing power switching. With this, for example, in normal navigation, power can be fed to the return-to-port equipment 104 through the first power feeding line L1, and in navigation for making the ship 1A return to the port in a state in which fire or flood has been stopped, power can be fed to the return-to-port equipment 104 through the third power feeding line L3.

Next, a navigation method of the ship 1A will be described.

Figure 4:
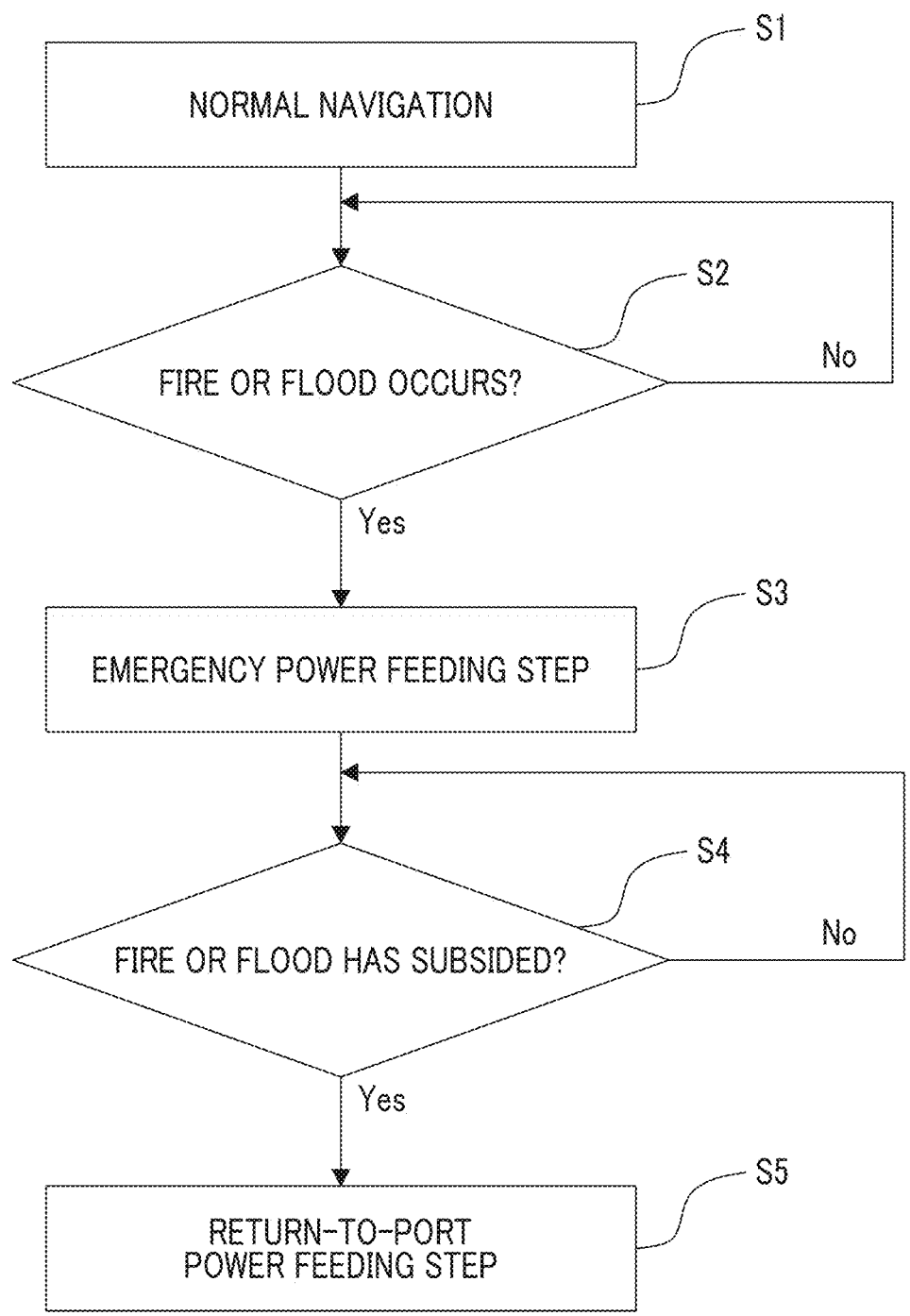
FIG. 4 is a diagram showing a flow in a case where fire or flood occurs in an engine room in navigation of the ship according to the first embodiment of the invention.
Figure 5:
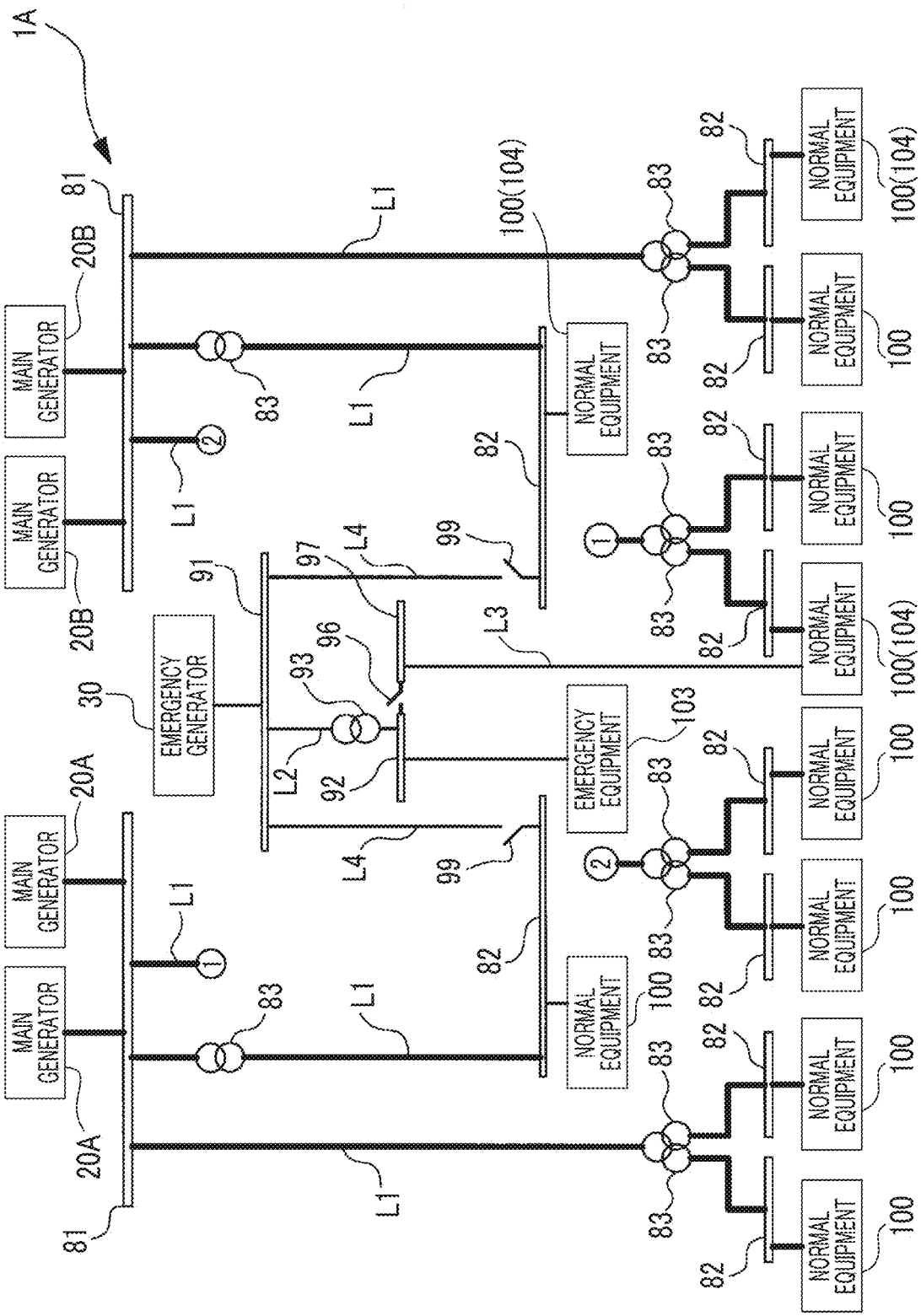
FIG. 5 is a diagram showing a power feeding state in normal navigation of the ship according to the first embodiment of the invention.
Figure 6:
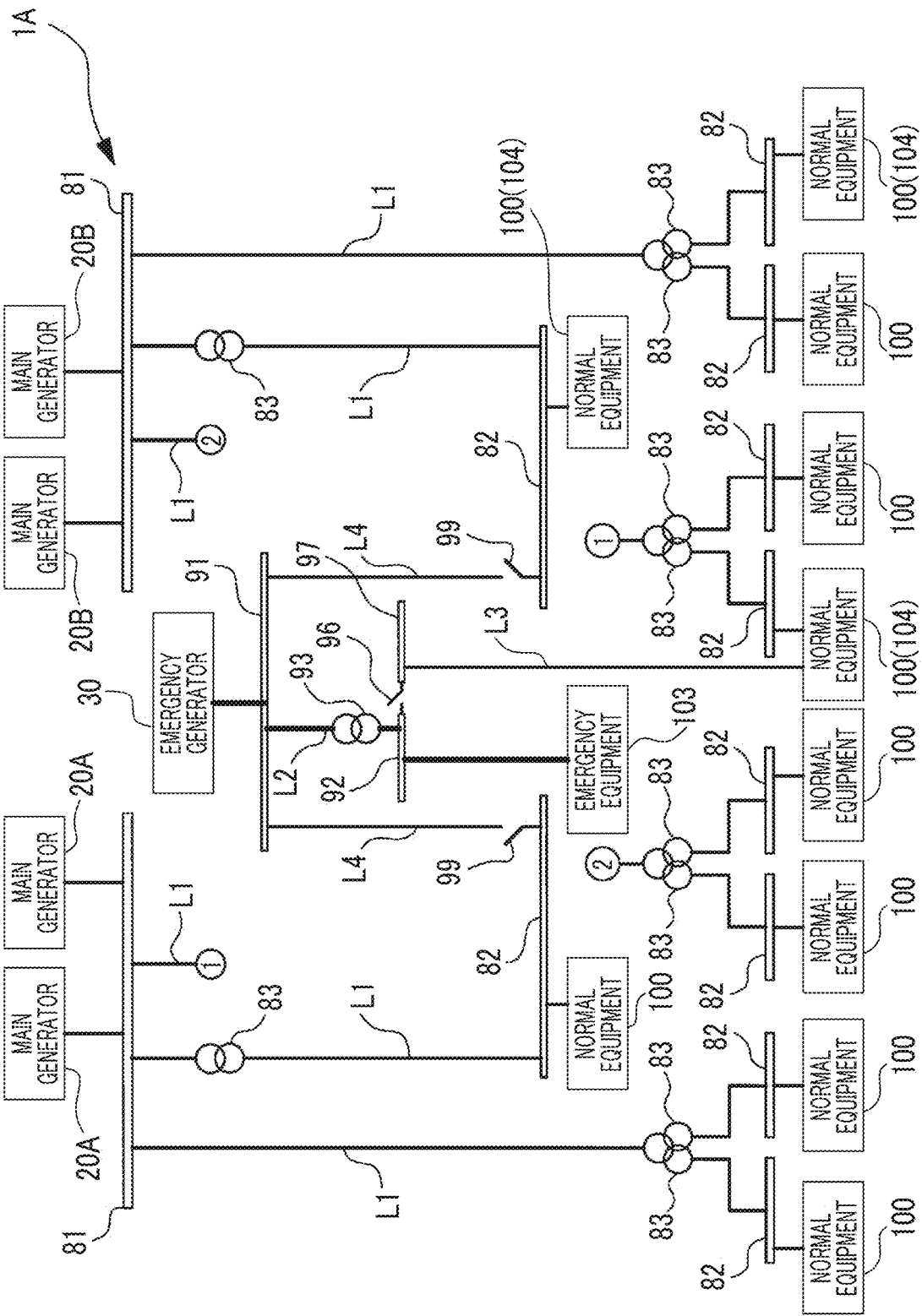
FIG. 6 is a diagram showing a power feeding state when fire or flood occurs in the ship according to the first embodiment of the invention.
Figure 7:
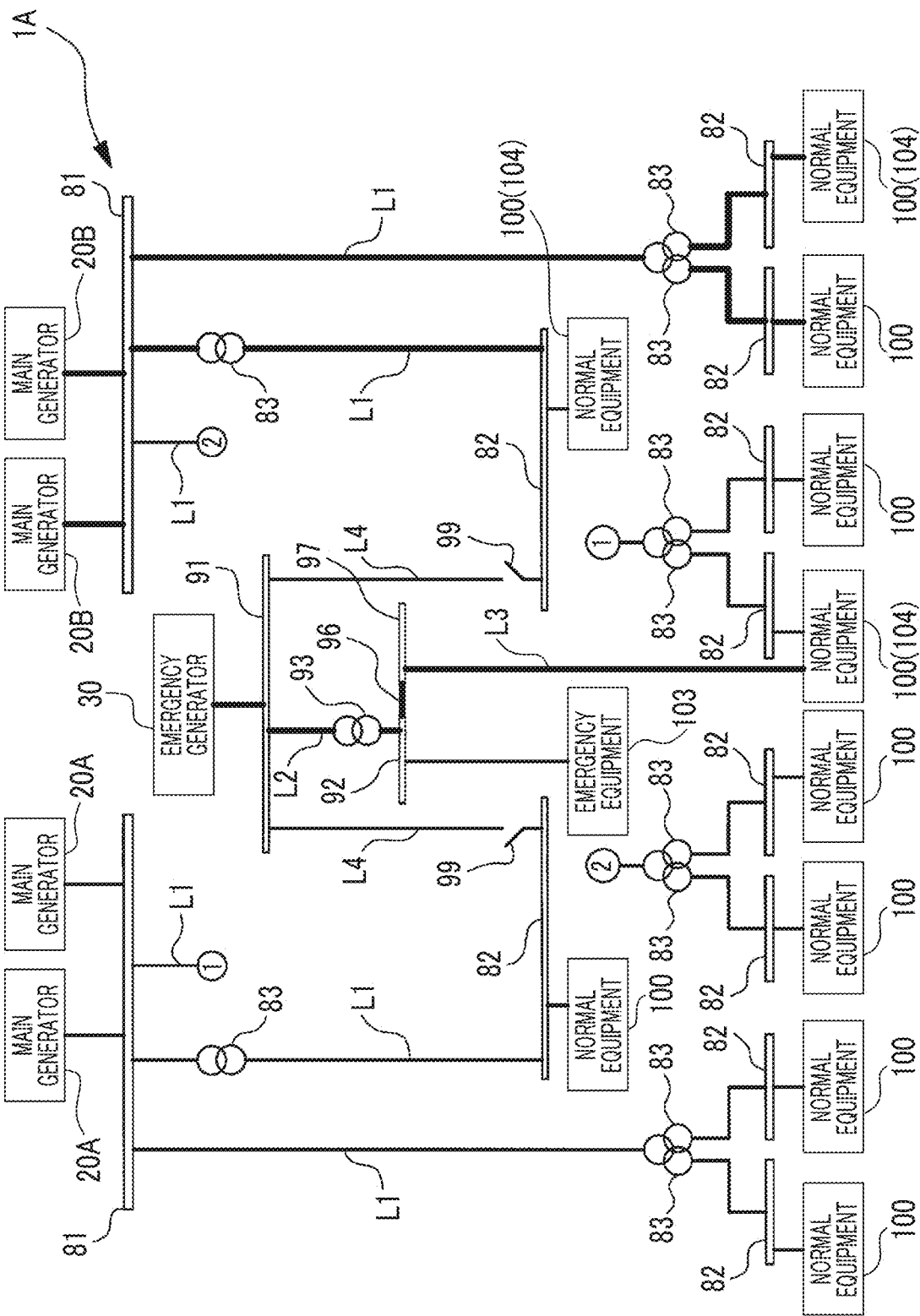
FIG. 7 is a diagram showing a power feeding state in returning to a port through self-dependent navigation after fire or flood has subsided in the ship according to the first embodiment of the invention.

FIG. 4 is a diagram showing a flow in a case where fire or flood occurs in an engine room in navigation of the ship according to the first embodiment of the invention. FIG. 5 is a diagram showing a power feeding state in normal navigation of the ship according to the first embodiment of the invention. FIG. 6 is a diagram showing a power feeding state when fire or flood occurs in the ship according to the first embodiment of the invention. FIG. 7 is a diagram showing a power feeding state in returning to the port through self-dependent navigation after fire or flood has subsided in the ship according to the first embodiment of the invention.

When the ship 1A is in normal navigation (Step S1 of FIG. 4), the emergency generator 30 is stopped, and power is fed only from the main generators 20A and 20B provided in the engine rooms 8A and 8B. Specifically, as indicated by a bold line in FIG. 5, power output from the main generators 20A and 20B is fed to the normal equipment 100 (the navigation equipment 101 and the living quarter appliances 102) through the generator-side switchboards 81, the first power feeding lines L1, the transformers 83, the equipment-side switchboards 82. With this, the propulsion motor 11, the steering system 12, and the like constituting the navigation equipment 101 are operated to make the ship 1A navigate, and the living quarter appliances 102 of the respective parts inside the ship 1A are enabled.

In a case where fire or flood occurs in the engine room 8A or the engine room 8B (in Step S2 of FIG. 4, "Yes"), power feeding from the main generators 20A and 20B is stopped, and transition is made to an emergency power feeding step in which power is fed from the emergency generator 30 to the emergency equipment 103 (Step S3). Specifically, as indicated by a bold line in FIG. 6, power to be output from the emergency generator 30 is fed to the emergency equipment 103 through the generator-side switchboard 91, the second power feeding line L2, the transformer 93, and the equipment-side switchboard 92. At this time, the switch 96 of the third power feeding line L3 is brought into an open state, and the equipment-side switchboard 92 of the second power feeding line L2 and the equipment-side switchboard 97 of the third power feeding line L3 are electrically disconnected.

The drainage pump 31, the ballast pump 32, and the fire pump 33 are selectively operated with power fed from the emergency generator 30 in this way as necessary, thereby performing drainage of water entering the ship body 2, improvement of inclination of the ship body 2, and extinction of fire. Furthermore, minimum illumination inside the ship 1A is performed with the emergency illumination 34. In addition, at least the steering system 12 is operated with power to be fed from the emergency generator 30, thereby preventing drifting or the like of the ship 1A.

In a case where fire or flood has subsided in the engine room 8A or the engine room 8B (in Step S4 of FIG. 4, "Yes"), the operations of the drainage pump 31, the ballast pump 32, the fire pump 33, and the emergency illumination of the emergency equipment 103 are stopped, and transition is made to a return-to-port power feeding step in which a self-dependent navigation step of the ship 1A is performed (Step S5).

For this, as indicated by a bold line in FIG. 7, the switch 96 is brought into a closed state, and the equipment-side switchboard 92 of the second power feeding line L2 and the equipment-side switchboard 97 of the third power feeding line L3 are electrically connected. With this, power fed from the emergency generator 30 can be fed to the return-to-port equipment 104 through the generator-side switchboard 91, the second power feeding line L2, the equipment-side switchboard 92, the switch 96, the equipment-side switchboard 97, and the third power feeding line L3. With this, for example, it is possible to operate at least a preset part of the air conditioning equipment 21, the refrigerating and freezing system 22, the drinking water facility 23, the toilet drainage facility 24, the living quarter facility 25, cooking facility 26, and the general illumination 27.

In the return-to-port power feeding step, one of the engine room 8A and the engine room 8B is disabled due to fire or flood. Accordingly, the main generators 20A or 20B (in the example of FIG. 7, the main generator 20B of the engine room 8B) provided in the other engine room of the engine room 8A and the engine room 8B, that is, the engine room where fire or flood does not occur are operated, and power is fed to equipment at least required for returning to the port through self-dependent navigation, for example, the navigation equipment 101. With this, the propulsion motor 11, the steering system 12, and the like constituting the navigation equipment 101 are operated, thereby making the ship 1A navigate in a self-dependent manner.

In the return-to-port power feeding step, the main generators 20A and 20B may feed power only to at least a part of the navigation equipment 101, for example, the propulsion motor 11, and the emergency generator 30 may feed power to the steering system 12.

In addition, in the return-to-port power feeding step, the emergency generator 30 can feed power only to a part of the living quarter appliances 102 as the return-to-port equipment 104, and the main generators 20A and 20B can feed power another part of the living quarter appliances 102.

With the navigation method for a ship, and the ship of the first embodiment, transition is made to the return-to-port power feeding step in which power is fed to the return-to-port equipment 104 required for navigation for returning to the port using the main generators 20A and 20B and the emergency generator 30 after fire or flood has subsided. In this way, power is fed to the return-to-port equipment 104 required for navigation for returning to the port using the emergency generator 30 after fire or flood has subsided, whereby it is possible to secure power required for operating the return-to-port equipment 104.

In addition, even in a case where a part of the main generators 20A or the main generators 20B that should be operated in the return-to-port power feeding step is disabled due to failure, maintenance, or the like, it is possible to operate a part of the return-to-port equipment 104 with power to be fed from the emergency generator 30. With this, it is possible to suppress shortage of power required for navigation for returning to the port, and even in a case where a part of the main generators 20A or the main generators 20B is disabled due to failure, maintenance, or the like, it is possible to make the ship 1A return to the port through self-dependent navigation.

Accordingly, in order to secure power that is fed to the return-to-port equipment 104 required for returning to the port after fire or flood has subsided, there is no need to increase the capacity of the main generators 20A and 20B or the number of main generators 20A and 20B is not required. As a result, it is possible to suppress shortage of a power feeding amount in returning to the port through self-dependent navigation after fire or flood occurs while suppressing an increase in equipment cost and an increase in weight.

In addition, in the return-to-port power feeding step, the emergency generator 30 feeds power to at least a part of the living quarter appliances 102. With this, it is possible to feed power to a part of equipment required for living quarters within the ship body 2 using the emergency generator 30 in returning to the port after fire or flood has subsided.

In addition, in the return-to-port power feeding step, when the main generators 20A and 20B feed power to at least a part of the navigation equipment 101, it is possible to feed power to the minimum navigation equipment 101 required for returning to the port using the main generators 20A and 20B. The main generators 20A and 20B can feed power another part of the living quarter appliances 102 excluding a part of the living quarter appliances 102 to which power is fed from the emergency generator 30. With this, it is possible to feed power to the equipment required for living quarters inside the ship body 2 using the main generators 20A and 20B and the emergency generator 30 in returning to the port after fire or flood has subsided.

In normal navigation, it is possible to feed power from the plurality of main generators 20A and 20B to the navigation equipment 101 and the living quarter appliances 102 through the first power feeding line L1. When fire, flood, or the like occurs, it is possible to feed power from the emergency generator 30 to the emergency equipment 103 through the second power feeding line L2. When the ship 1A is made to return to the port in a state in which fire or flood has been stopped, it is possible to feed power from the emergency generator 30 to the return-to-port equipment 104 through the third power feeding line L3.

The main generators 20A and 20B are provided in a lower portion inside the ship body 2, and the emergency generator 30 is provided in the upper structure 6 that is a part equal to or higher than the upper deck 5 of the ship body 2. With this, even though fire or flood occurs in the engine rooms 8A and 8B where the main generators 20A and 20B, it is possible to operate the emergency generator 30 to feed power while suppressing the influence of fire or flood. Accordingly, it is possible to reliably execute subsidence of fire or flood and return-to-port of the ship 1A after fire or flood has subsided.

Second Embodiment

Next, a navigation method for a ship, and a ship according to a second embodiment of the invention will be described referring to the drawings. In the second embodiment described below, since only a power feeding form in the return-to-port power feeding step is different from in the first embodiment, the same portions as those in the first embodiment are represented by the same reference numerals, and overlapping description will not be repeated.

Figure 8:
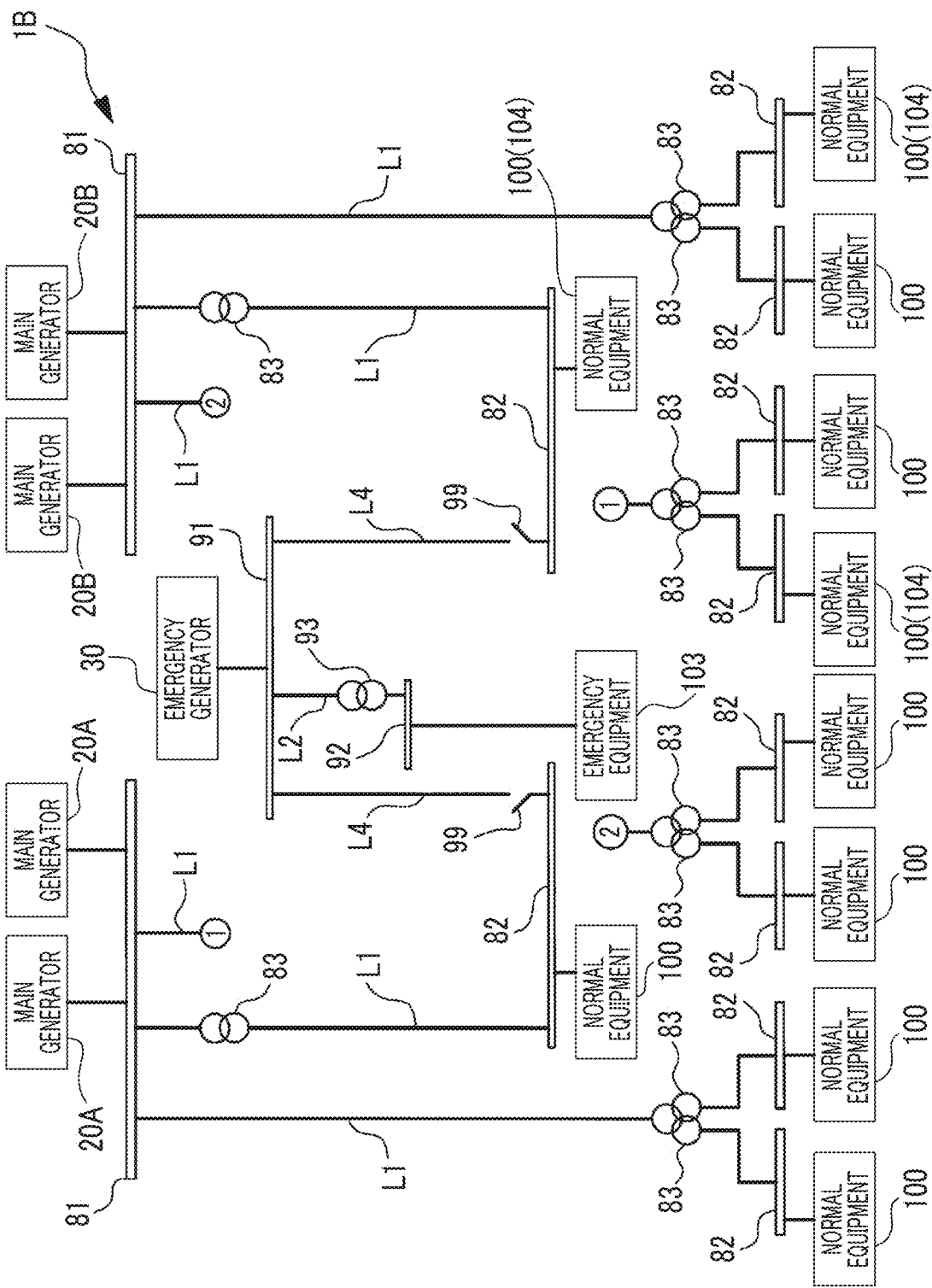
FIG. 8 is a diagram showing a power feeding system from main generators and an emergency generator in a ship according to a second embodiment of the invention.
Figure 9:
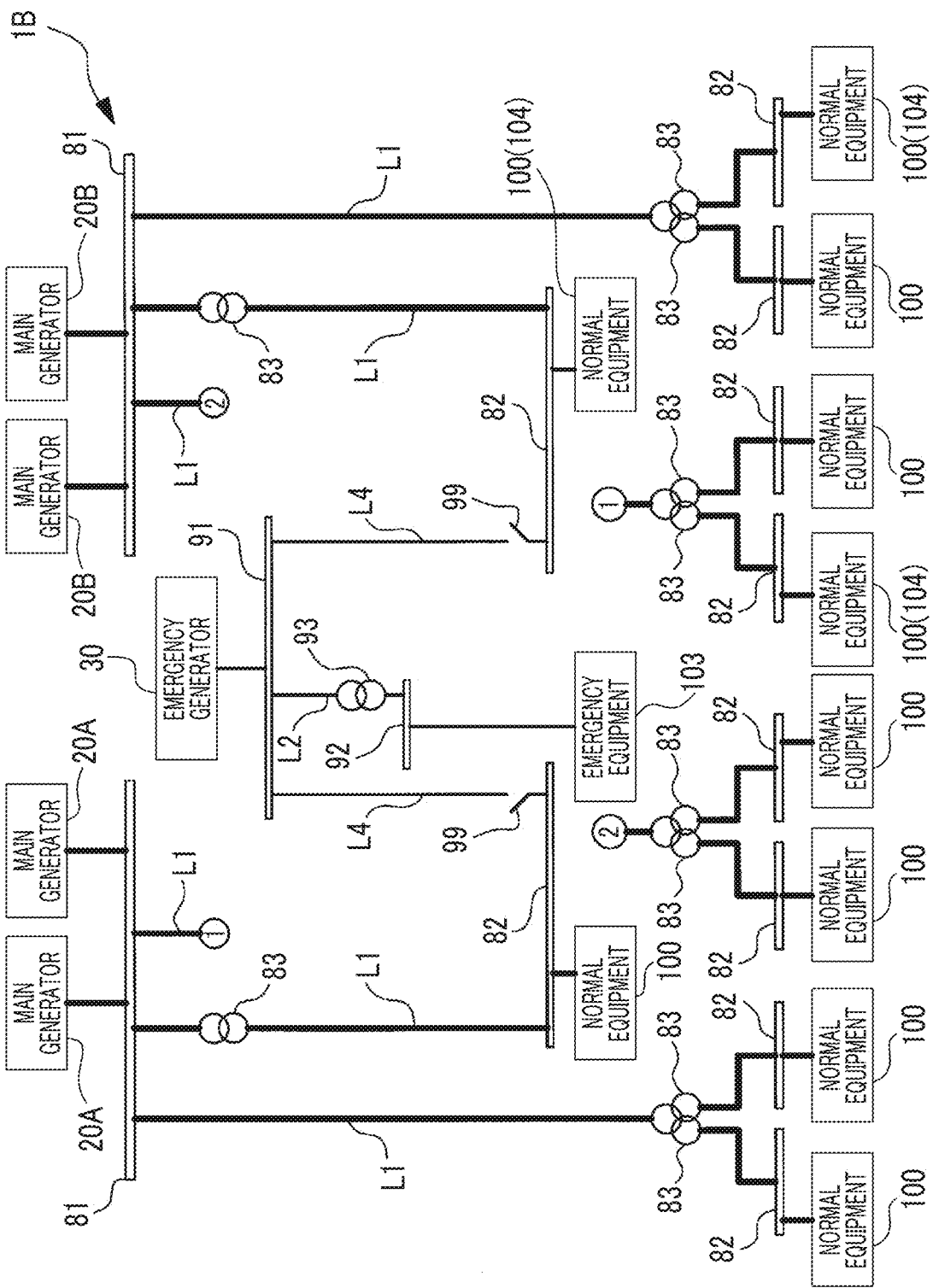
FIG. 9 is a diagram showing a power feeding state in normal navigation of the ship according to the second embodiment of the invention.
Figure 10:
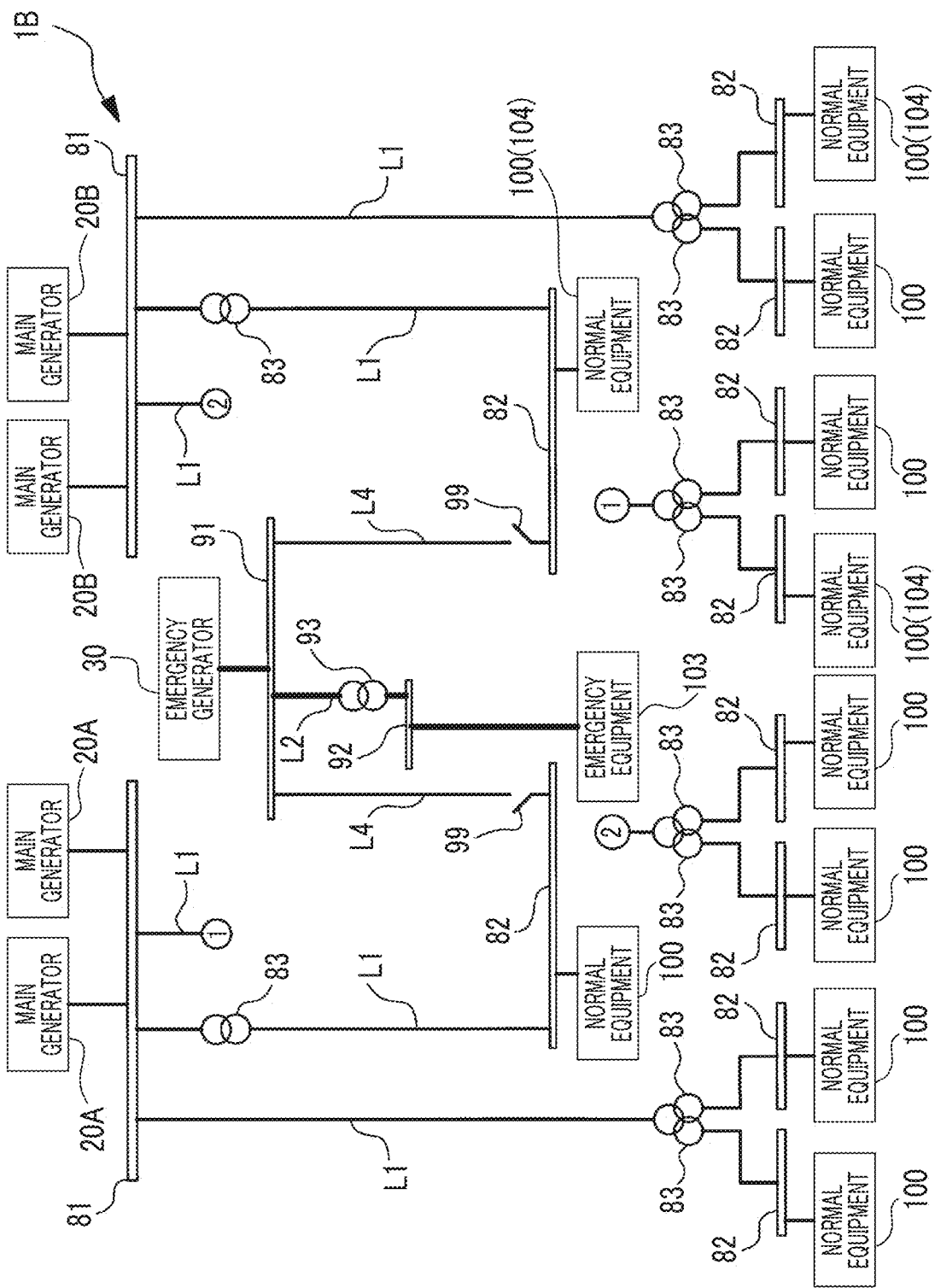
FIG. 10 is a diagram showing a power feeding state when fire or flood occurs in the ship according to the second embodiment of the invention.

FIG. 8 is a diagram showing a power feeding system from main generators and an emergency generator in a ship according to a second embodiment of the invention. FIG. 9 is a diagram showing a power feeding state in normal navigation of the ship according to the second embodiment of the invention. FIG. 10 is a diagram showing a power feeding state when fire or flood occurs in the ship according to the second embodiment of the invention. FIG. 11 is a diagram showing a power feeding state in returning to a port through self-dependent navigation after fire or flood has subsided in the ship according to the second embodiment of the invention.

As shown in FIG. 8, a ship 1B of the embodiment does not include the third power feeding line L3, the switch 96, and the equipment-side switchboard 97 in contrast to the configuration shown in the first embodiment.

In the ship 1B, third power feeding lines L4 that connect the generator-side switchboard 91 connected to the emergency generator 30 and a part of the equipment-side switchboards 82 are provided. In the third power feeding lines L4, switches 99 are provided. The generator-side switchboard 91 and the equipment-side switchboards 82 can be electrically connected and disconnected by the switches 99.

In the ship 1B having such a configuration, in normal navigation, as shown in FIG. 9, similarly to the ship 1A of the first embodiment, power is fed from the main generators 20A and 20B provided in the engine rooms 8A and 8B. At this time, the switches 99 of the third power feeding line L4 are brought into an open state, and the generator-side switchboard 91 and the equipment-side switchboards 82 are electrically disconnected.

With this, power to be output from the main generators 20A and 20B is fed to the normal equipment 100 (the navigation equipment 101 and the living quarter appliances 102) through the generator-side switchboards 81, the first power feeding lines L1, the transformers 83, and the equipment-side switchboards 82. With this, the propulsion motor 11, the steering system 12, and the like constituting the navigation equipment 101 are operated, the ship 1B is made to navigate, and power is fed to the living quarter appliances 102 of the parts inside the ship 1B.

As shown in FIG. 10, in a case where fire or flood occurs in the engine room 8A or the engine room 8B (see Step S2 of FIG. 4), power feeding from the main generators 20A and 20B is stopped, and transition is made to the emergency power feeding step in which power is fed from the emergency generator 30 to the emergency equipment 103 (see Step S3 of FIG. 4). With this, power to be output from the emergency generator 30 is fed to the emergency equipment 103 through the generator-side switchboard 91, the second power feeding line L2, the transformer 93, and the equipment-side switchboard 92.

The drainage pump 31, the ballast pump 32, and the fire pump 33 are selectively operated with power fed from the emergency generator 30 in this way as necessary, thereby performing drainage of water entering the ship body 2, improvement of inclination of the ship body 2, and extinction of fire. Furthermore, minimum illumination inside the ship 1B is performed with the emergency illumination 34. In addition, at least the steering system 12 is operated with power to be fed from the emergency generator 30, thereby preventing drifting or the like of the ship 1B.

In a case where fire or flood has subsided in the engine room 8A or the engine room 8B (see Step S4 of FIG. 4), the operations of the drainage pump 31, the ballast pump 32, the fire pump 33, and the emergency illumination 34 of the emergency equipment 103 are stopped, and transition is made to a return-to-port power feeding step in which a self-dependent navigation step of the ship 1B is performed (see Step S5 of FIG. 4).

In the second embodiment, in the return-to-port power feeding step, power feeding from the main generators 20A or the main generators 20B and power feeding from the emergency generator 30 are interlocked. For this, as shown in FIG. 11, the switch 99 of the third power feeding line L4 is brought into a closed state, and the generator-side switchboard 91 and the equipment-side switchboard 82 are connected through the third power feeding line L4. With this, power fed from the emergency generator 30 is fed to the normal equipment 100 constituting the return-to-port equipment 104 through the generator-side switchboard 91, the third power feeding line L4, and the equipment-side switchboard 82.

In the embodiment, the emergency generator 30 feeds power to equipment having small load fluctuation in the return-to-port equipment 104, for example, the living quarter appliances 102 and the steering system 12 in the navigation equipment 101.

The main generators 20A or the main generators 20B provided in the engine room where fire or flood does not occur between the engine rooms 8A and 8B feed power to the propulsion motor 11 constituting the navigation equipment 101 as the return-to-port equipment 104.

The emergency generator 30 has facility capacity (or rated output) lower than that of the main generators 20A and 20B.

In the ship 1B of the embodiment, in the return-to-port power feeding step, power to be fed from the emergency generator 30 is fixed, and power to be fed from the main generators 20A and 20B is made to fluctuate according to load fluctuation or the like of the propulsion motor 11.

Accordingly, with the navigation method for a ship, and the ship of the second embodiment described above, when required power fluctuates according to load fluctuation or the like of the propulsion motor 11, power to be fed using the main generators 20A and 20B having facility capacity (or rated output) greater than that of the emergency generator 30 is made to fluctuate. With this, whereby it is possible to cope with large load fluctuation more than in a case where power to be fed using the emergency generator 30 having smaller facility capacity (or rated output) is made to fluctuate. With this, it is possible to make fed power cope with fluctuation of required power more flexibly.

As in the first embodiment, power is fed to the return-to-port equipment 104 required for navigation for returning to the port using using the main generators 20A and 20B and the emergency generator 30, instead of only the main generators 20A and 20B, after fire or flood has subsided, whereby it is possible to increase power capable of being fed to the return-to-port equipment 104.

Furthermore, even in a case where a part of the main generators 20A or 20B that should be operated in the return-to-port power feeding step is disabled due to failure, maintenance, or the like, it is possible to operate a part of the return-to-port equipment 104 with power to be fed from the emergency generator 30. With this, it is possible to suppress shortage of power required for navigation for returning to the port.

Accordingly, in order to secure power to be fed to the return-to-port equipment 104 required for returning to the port after fire or flood has subsided, there is no need to increase the capacity of the main generators 20A and 20B or the number of main generators 20A and 20B.

As a result, it is possible to suppress shortage of a power feeding amount in returning to the port through self-dependent navigation after fire or flood occurs while suppressing an increase in equipment cost and an increase in weight.

OTHER MODIFICATION EXAMPLES

The invention is not limited to the above-described embodiments, and includes embodiments obtained by modifying the above-described embodiments in various ways without departing from the gist of the invention. That is, the specific shapes, configurations, or the like exemplified in the embodiments are merely examples, and can be appropriately modified.

For example, in the above-described embodiments, although a power feeding destination from the emergency generator 30 and the main generators 20A and 20B is illustrated in return-to-port power feeding, the power feeding destination can be appropriately modified.

REFERENCE SIGNS LIST 1A, 1B: ship
2: ship body
2A: stern part
2F: bow part
2b: ship bottom
2s: broadside
3: freeboard deck
4: lower deck
5: upper deck
6: upper structure
7: screw
8A, 8B: engine room
9: transverse bulkhead
11: propulsion motor
12: steering system
20A, 20B: main generator
21: air conditioning equipment
22: refrigerating and freezing system
23: drinking water facility
24: toilet drainage facility
25: living quarter facility
26: cooking facility
27: general illumination
30: emergency generator
31: drainage pump
32: ballast pump
33: fire pump
34: emergency illumination
81, 91: generator-side switchboard
82, 92, 97: equipment-side switchboard
83, 93: transformer
96, 99: switch
100: normal equipment
101: navigation equipment
102: living quarter appliance
103: emergency equipment
104: return-to-port equipment
FA: bow and stern direction
L1: first power feeding line
L2: second power feeding line
L3, L4: third power feeding line

The invention claimed is:

1. A navigation method for a ship including a plurality of main generators that feed power to navigation equipment for use in normal navigation and living quarter appliances provided inside a ship body, and an emergency generator that feeds power to emergency equipment when fire or flood occurs, the navigation method comprising:
   an emergency power feeding step of feeding power to the emergency equipment using the emergency generator when at least a part of the plurality of main generators are disabled due to fire or flood; and
   a return-to-port power feeding step of feeding power to return-to-port equipment required for navigation for returning to a port using the main generators and the emergency generator after fire or flood has subsided;
   wherein, in the return-to-port power feeding step, the emergency generator feeds power to at least a part of the living quarter appliances, and wherein, in the return-to-port power feeding step, the main generators feed power to at least a part of the navigation equipment and another part of the living quarter appliances.

2. The navigation method for a ship according to claim 1, wherein, in the return-to-port power feeding step, power to be fed using the emergency generator having facility capacity smaller than that of the main generators is fixed, and power to be fed using the main generators is changed as required.

3. A ship comprising:
a ship body;
a plurality of main generators provided inside the ship body;
an emergency generator provided inside the ship body;
a first power feeding line that connects navigation equipment for use in normal navigation and living quarter appliances provided inside the ship body to the plurality of main generators;
a second power feeding line that connects, to the emergency generator, emergency equipment for use when fire or flood occurs; and
a third power feeding line that connects return-to-port equipment for use in navigation for returning the ship to a port as a part of the living quarter appliances to the emergency generator in a state in which fire or flood has been stopped.

4. The ship according to claim 3, wherein
the main generator is provided in a lower portion inside the ship body, and
the emergency generator is provided in a part equal to or higher than an upper deck of the ship body.

5. The ship according to claim 3, wherein
the return-to-port equipment is connected to the first power feeding line and the third power feeding line to allow power switching.

\* \* \* \* \*